United States Patent
Shpak (10) Patent No.: US 7,164,674 B2
(45) Date of Patent: *Jan. 16, 2007

(54) MULTIPLEX COMMUNICATION BETWEEN ACCESS POINTS AND HUB

(75) Inventor: Eran Shpak, Tel Aviv (IL)

(73) Assignee: Extricom Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/364,464

(22) Filed: Feb. 27, 2006

(65) Prior Publication Data

US 2006/0146747 A1 Jul. 6, 2006

Related U.S. Application Data

(63) Continuation of application No. 10/696,769, filed on Oct. 27, 2003, now Pat. No. 7,035,243, which is a continuation-in-part of application No. 10/370,211, filed on Feb. 18, 2003.

(51) Int. Cl.
*H04Q 7/20* (2006.01)
(52) U.S. Cl. .................. 370/338; 370/343; 370/537
(58) Field of Classification Search ................ 370/338, 370/328, 343, 535, 537, 445
See application file for complete search history.

(56) References Cited

U.S. PATENT DOCUMENTS

| | | | |
|---|---|---|---|
| 4,789,983 A | 12/1988 | Acampora | |
| 5,280,472 A | 1/1994 | Gilhousen et al. | |
| 5,570,352 A * | 10/1996 | Poyhonen | 370/330 |
| 5,842,117 A | 11/1998 | Rosenberg et al. | |
| 5,864,265 A | 1/1999 | Ballance et al. | |
| 5,912,921 A | 6/1999 | Warren | |
| 5,923,702 A | 7/1999 | Brenner et al. | |
| 5,960,344 A | 9/1999 | Mahany | |
| 6,047,175 A | 4/2000 | Trompower | |
| 6,192,026 B1 | 2/2001 | Pollack et al. | |
| 6,196,456 B1 | 3/2001 | Taylor | |
| 6,259,898 B1 * | 7/2001 | Lewis | 455/103 |
| 6,381,458 B1 | 4/2002 | Frodigh | |
| 6,393,261 B1 * | 5/2002 | Lewis | 455/103 |
| 6,463,303 B1 | 10/2002 | Zhao | |
| 6,529,164 B1 | 3/2003 | Carter | |
| 6,560,443 B1 | 5/2003 | Vaisanen | |
| 6,560,448 B1 | 5/2003 | Baldwin et al. | |
| 6,580,704 B1 | 6/2003 | Wellig et al. | |
| 6,590,884 B1 | 7/2003 | Panasik | |
| 6,671,284 B1 | 12/2003 | Yonge et al. | |
| 6,674,403 B1 | 1/2004 | Gray et al. | |
| 6,741,643 B1 | 5/2004 | McGibney | |

(Continued)

OTHER PUBLICATIONS

IEEE Draft Supplement 802.11h, "Spectrum and Transmit Power Management Extensions in the 5 GHz Band in Europe", Publication P802.11h/D2.1 of the IEEE Standards Department, Piscataway, New Jersey, Jul. 2002.

(Continued)

*Primary Examiner*—Min Jung
(74) *Attorney, Agent, or Firm*—Blakely Sokoloff Taylor & Zafman (57) ABSTRACT

An access point for use in a wireless local area network (WLAN) includes a plurality of wireless communication units, which are adapted to exchange data with mobile stations by transmitting and receiving signals over the air on different, respective frequency channels of the WLAN. A physical layer interface in the access point is adapted to be coupled to a communication medium, so as to connect the plurality of wireless communication units to communicate with a hub over a single physical link of the communication medium.

23 Claims, 4 Drawing Sheets

U.S. PATENT DOCUMENTS

| | | |
|---|---|---|
| 6,771,933 B1 * | 8/2004 | Eng et al. .................. 455/41.2 |
| 6,785,558 B1 | 8/2004 | Stratford |
| 6,801,767 B1 | 10/2004 | Schwartz |
| 2002/0009982 A1 | 1/2002 | Kim |
| 2002/0061024 A1 | 5/2002 | Malkemes et al. |
| 2002/0114303 A1 | 8/2002 | Crosbie et al. |
| 2002/0142771 A1 | 10/2002 | Saifullah et al. |
| 2002/0197984 A1 | 12/2002 | Monin et al. |
| 2003/0007475 A1 * | 1/2003 | Tsuda et al. ................ 370/338 |
| 2003/0012174 A1 | 1/2003 | Bender et al. |
| 2003/0063593 A1 | 4/2003 | Koyanagi et al. |
| 2003/0133422 A1 | 7/2003 | Bims |
| 2003/0137959 A1 | 7/2003 | Nebiker et al. |
| 2003/0174681 A1 | 9/2003 | Gilberton et al. |
| 2003/0181221 A1 | 9/2003 | Nguyen |
| 2003/0210674 A1 * | 11/2003 | Honkasalo et al. ......... 370/338 |

OTHER PUBLICATIONS

ANSI/IEEE Standard 801.11 (1999 Edition), Part 11: Wireless LAN Medium Access Control (MAC) and Physical Layer (PHY) Specifications.

U.S. Appl. No. 10/214,271, entitled: "Collaboration between wireless lan access points", filed Aug. 7, 2002.

U.S. Appl. No. 10/272,686, entitled: "Collaboration between wireless lan access points using wired lan infrastructure", filed Oct. 17, 2002.

U.S. Appl. No. 10/343,863, entitled: "Lan with message interleaving", filed Jan. 22, 2003.

* cited by examiner

MULTIPLEX COMMUNICATION BETWEEN ACCESS POINTS AND HUB

CROSS-REFERENCE TO RELATED APPLICATION

The present patent application is a Continuation application of application Ser. No. 10/696,769, filed Oct. 27, 2003 now U.S. Pat. No. 7,035,243, which is a continuation-in-part of U.S. patent application Ser. No. 10/370,211, filed Feb. 18, 2003, which is assigned to the assignee of the present patent application and whose disclosure is incorporated herein by reference.

FIELD OF THE INVENTION

The present invention relates generally to wireless communications, and specifically to methods and devices for improving the performance of wireless local area networks.

BACKGROUND OF THE INVENTION

Wireless local area networks (WLANs) are gaining in popularity, and new wireless applications are being developed. The original WLAN standards, such as "Bluetooth" and IEEE 802.11, were designed to enable communications at 1–2 Mbps in a band around 2.4 GHz. More recently, IEEE working groups have defined the 802.11a, 802.11b and 802.11g extensions to the original standard, in order to enable higher data rates. The 802.11a standard, for example, envisions data rates up to 54 Mbps over short distances in a 5 GHz band, while 802.11b defines data rates up to 22 Mbps in the 2.4 GHz band. In the context of the present patent application and in the claims, the term "802.11" is used to refer collectively to the original IEEE 802.11 standard and all its variants and extensions, unless specifically noted otherwise.

The theoretical capability of new WLAN technologies to offer high communication bandwidth to mobile users is severely hampered by the practical limitations of wireless communications. Indoor propagation of radio frequencies is not isotropic, because radio waves are influenced by building layout and furnishings. Therefore, even when wireless access points are carefully positioned throughout a building, some "black holes" generally remain—areas with little or no radio reception. Furthermore, 802.11 wireless links can operate at full speed only under conditions of high signal/noise ratio. Signal strength scales inversely with the distance of the mobile station from its access point, and therefore so does communication speed. A single mobile station with poor reception due to distance or radio propagation problems can slow down WLAN access for all other users in its basic service set (BSS—the group of mobile stations communicating with the same access point in a conventional 802.11 WLAN).

The natural response to these practical difficulties would be to distribute a greater number of access points within the area to be served. If a receiver receives signals simultaneously from two sources of similar strength on the same frequency channel, however, it is generally unable to decipher either signal. The 802.11 standard provides a mechanism for collision avoidance based on clear channel assessment (CCA), which requires a station to refrain from transmitting when it senses other transmissions on its frequency channel. In practice, this mechanism is of limited utility and can place a heavy burden on different BSSs operating on the same frequency channel.

Therefore, in high data-rate 802.11 WLANs known in the art, access points in mutual proximity must use different frequency channels. Theoretically, the 802.11b and 802.11g standards define 14 frequency channels in the 2.4 GHz band, but because of bandwidth and regulatory limitations, WLANs operating according to these standards in the United States actually have only three non-overlapping frequency channels from which to choose. In the 5 GHz band, a larger number of frequency channels is available.

SUMMARY OF THE INVENTION

Embodiments of the present invention provide access points for use in a wireless local area network (WLAN), which are capable of communicating on multiple frequency channels simultaneously, unlike access points known in the art. Each such access point comprises multiple wireless communication units, each comprising its own radio transceiver. Each transceiver is tuned for operation on a different, respective frequency channel of the WLAN. Therefore, from the point of view of the mobile stations, each multi-channel access point behaves effectively as though it were a set of several collocated single-channel access points. The transceivers in each access point may simultaneously serve multiple mobile stations, each on a respective channel, while avoiding the need to deploy separate access points for each channel.

The access points communicate with a hub over a communication medium, typically a wired LAN. This medium serves, inter alia, as the distribution system medium (as defined in the 802.11 specification) for connecting the access points (APs) to networks external to the WLAN system. The wireless communication units in each multi-channel access point share a common physical layer interface (PHY) to the communication medium. A multiplexer, coupled between the channel processors and the physical layer interface, enables all the wireless communication units to send and receive data over the same physical link of the communication medium. Since only a single physical link is thus required between each multi-channel access point and the hub, the cost and logistics involved in deploying the multi-channel access points are no greater than would be required for conventional, single-channel access points.

In some embodiments of the present invention, the multiplexer combines the data from multiple channels into data frames for transmission over the communication medium using a novel multiplexing protocol. Each frame is divided into a sequence of slots, or chunks. In each chunk, the multiplexer inserts data from one of the channels and adds a chunk header indicating the channel to which the chunk belongs. The frames are demultiplexed and processed by the hub. The hub likewise transmits multiplexed data frames over the communication medium to be demultiplexed at each of the access points. The chunks may be used both to carry data, which are transmitted by the access points to and from the mobile stations that they serve, and to carry control messages between the hub and the access points themselves.

There is therefore provided, in accordance with an embodiment of the present invention, an access point for use in a wireless local area network (WLAN), the access point including:

a plurality of wireless communication units, which are adapted to exchange data with mobile stations by transmitting and receiving signals over the air on different, respective frequency channels of the WLAN; and a physical layer interface, which is adapted to be coupled to a communication medium, so as to connect the plurality of wireless communication units to communicate with a hub over a single physical link of the communication medium.

In some embodiments, the wireless communication units are adapted to communicate with the mobile stations substantially in accordance with an IEEE 802.11 specification, which defines the frequency channels.

Typically, the communication medium includes a wired local area network (LAN). In a disclosed embodiment, the physical layer interface is adapted to transmit and receive data frames over the communication medium in accordance with an Ethernet physical layer specification. The communication medium may be a distribution system medium of the WLAN.

In some embodiments, the access point includes a multiplexer, coupled between the wireless communication units and the physical layer interface so as to selectively convey the data from the plurality of the wireless communication units to the physical layer interface for transmission over the single physical link. Typically, the access point also includes a demultiplexer, coupled between the wireless communication units and the physical layer interface so as to distribute the data received over the single physical link among the plurality of the wireless communication units. The multiplexer and the demultiplexer may be adapted to convey control messages, in addition to the data, which are transmitted over the communication medium between the access points and the hub.

Additionally or alternatively, the multiplexer is adapted to generate frames of the data for transmission over the physical link, and to combine chunks of the data from two or more of the wireless communication units into each of at least some of the frames. In a disclosed embodiment, each of the frames includes a plurality of slots of substantially fixed length, and the multiplexer is adapted to insert the chunks into respective slots together with chunk headers identifying the respective frequency channels to which the chunks belong. The multiplexer may be adapted to transfer the chunks of the data from the two or more of the wireless communication units in alternation into each of the at least some of the frames. In some embodiments, the data conveyed from the plurality of the wireless communication units includes data packets, and the multiplexer is adapted to fragment the packets among the chunks. Additionally or alternatively, the multiplexer is adapted to insert into the frames, in addition to the data, control messages for transmission between the access points and the hub.

There is also provided, in accordance with an embodiment of the present invention, a system for mobile communication, including:

a hub;

a communication medium, coupled to the hub; and a plurality of access points, each of which includes:

two or more wireless communication units, which are adapted to exchange data with mobile stations by transmitting and receiving signals over the air on different, respective frequency channels of a wireless local area network (WLAN); and a single physical layer interface, coupled to the communication medium, so as to connect the two or more wireless communication units to communicate with the hub over the communication medium.

Typically, the communication medium includes a plurality of links, which are coupled to the hub, and the physical layer interface is coupled to a single, respective link among the plurality of the links of the communication medium.

In a disclosed embodiment, the access points have respective service areas and are arranged so that at least some of the service areas substantially overlap. In this embodiment, the hub and the wireless communication units are arranged to exchange control messages over the communication medium, via the single physical layer interface, so as to determine which of the wireless communication units is to serve each of the mobile stations.

There is additionally provided, in accordance with an embodiment of the present invention, a method for mobile communication, including:

arranging an access point in a wireless local area network (WLAN), the access point including two or more wireless communication units, which are adapted to exchange data with mobile stations by transmitting and receiving signals over the air on different, respective frequency channels of the WLAN;

coupling the access point to a hub over a single physical communication link; and conveying the data between the plurality of the wireless communication units and the hub over the single link.

The present invention will be more fully understood from the following detailed description of the embodiments thereof, taken together with the drawings in which:

DETAILED DESCRIPTION OF EMBODIMENTS

Figure 1:
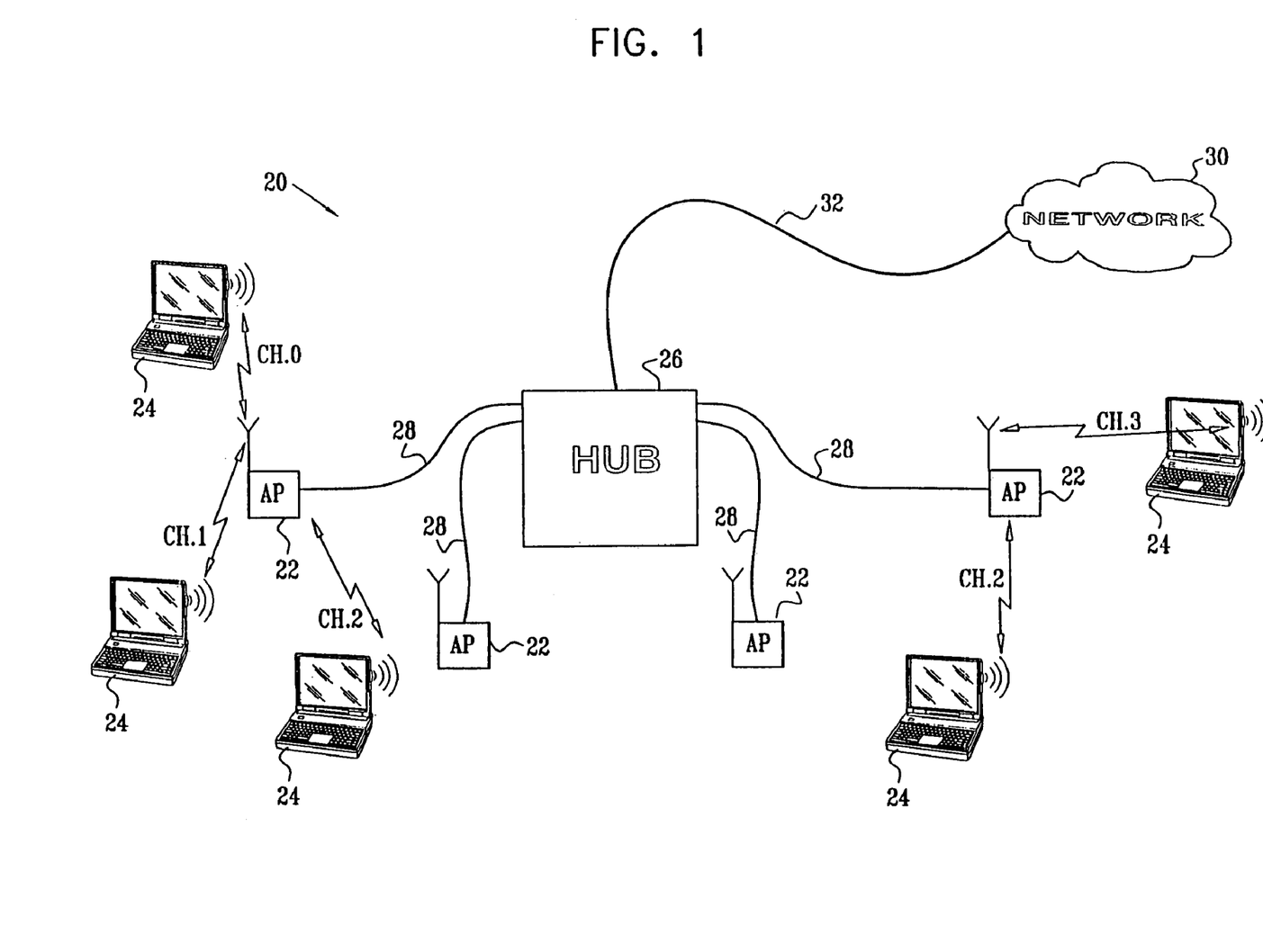
FIG. 1 is a block diagram that schematically illustrates a wireless LAN (WLAN) system, in accordance with an embodiment of the present invention.

FIG. 1 is a block diagram that schematically illustrates a wireless LAN (WLAN) system 20, in accordance with an embodiment of the present invention. System 20 comprises multiple access points 22, which are configured for data communication with mobile stations 24. Each access point is capable of transmitting and receiving signals simultaneously on multiple different frequency channels that are available on the WLAN, referred to as channels (CH) 0, 1, 2, 3, etc. (By contrast, in WLAN systems known in the art, each access point has a single frequency channel.) Mobile stations 24 typically comprise computing devices, such as desktop, portable or handheld devices.

In the exemplary embodiment described hereinbelow, it is assumed that the access points and mobile stations communicate with one another in accordance with one of the standards in the IEEE 802.11 family and observe the 802.11 medium access control (MAC) layer conventions. Details of the 802.11 MAC layer are described in ANSI/IEEE Standard 801.11 (1999 Edition), and specifically in *Part 11: Wireless LAN Medium Access Control (MAC) and Physical Layer (PHY) Specifications*, which is incorporated herein by reference. The principles of the present invention, however, are not limited to the 802.11 standards, and may likewise be applied to substantially any type of WLAN, including HiperLAN, Bluetooth and hiswan-based systems.

Each access points 22 is connected to a hub 26 by a link of a wired LAN 28. LAN 28 is typically physically configured as an Ethernet LAN, such as a 100BASE-TX LAN, and serves as the distribution system medium (DSM), as defined in the 802.11 specification, for carrying data to and from mobile stations 24. This arrangement enables mobile stations 24 to send and receive data through access points 22 to and from an external network 30, such as the Internet, via an access line 32 connected to hub 26. The access points may also use LAN 28 to communicate with the hub and/or with one another in order to coordinate their use of the available frequency channels and responses to mobile stations.

Although LAN 28 may conform to standard physical layer specifications, such as those provided by the Ethernet standard, however, access points 22 and hub 26 communicate over the LAN using a novel MAC-level multiplexing protocol. This protocol is described in detail hereinbelow. Alternatively or additionally, the access points and hub may use this novel protocol to communicate with one another over substantially any suitable communication medium, including wire, fiberoptics, or even free-space optical or radio communications (in an allowed frequency band that does not interfere with WLAN operation).

Access points 22 in system 20 are typically closely spaced, so that radio waves in a given frequency channel may reach mobile station 24 from multiple access points simultaneously, and radio messages transmitted by the mobile station may be received at multiple access points. In WLAN systems known in the art, under these circumstances, mobile station 24 would receive downlink messages from two or more of the access points, which would probably result in inability of the mobile station to communicate with any of the access points. In some embodiments of the present invention, the access points collaborate to resolve this conflict by exchanging control messages with hub over LAN 28 (or over whatever other medium is used to connect the access points). An exemplary method for such messaging and control is described in a U.S. patent application entitled, "Wireless LAN with Central Management of Access Points," filed Sep. 19, 2003. Alternatively, access points 22 may be configured to arbitrate among themselves to determine which access point is to serve a given mobile station, as described, for example, in U.S. patent application Ser. No. 10/214,271, filed Aug. 7, 2002; in U.S. patent application Ser. No. 10/272,686, filed Oct. 17, 2002; or in U.S. patent application Ser. No. 10/348,863, filed Jan. 22, 2003. All of the above applications are assigned to the assignee of the present patent application, and their disclosures are incorporated herein by reference.

Alternatively, access points 22 may be deployed in a conventional manner, so that the coverage areas of different access points in system 20 do not overlap. In this case, the special messaging and control capabilities described above are not required. Access points 22 are still advantageous over access points known in the art, in that they operate on multiple frequency channels (and thus can serve a larger number of mobile stations), while still using only a single link on LAN 28 to communicate with hub 26.

Figure 2:
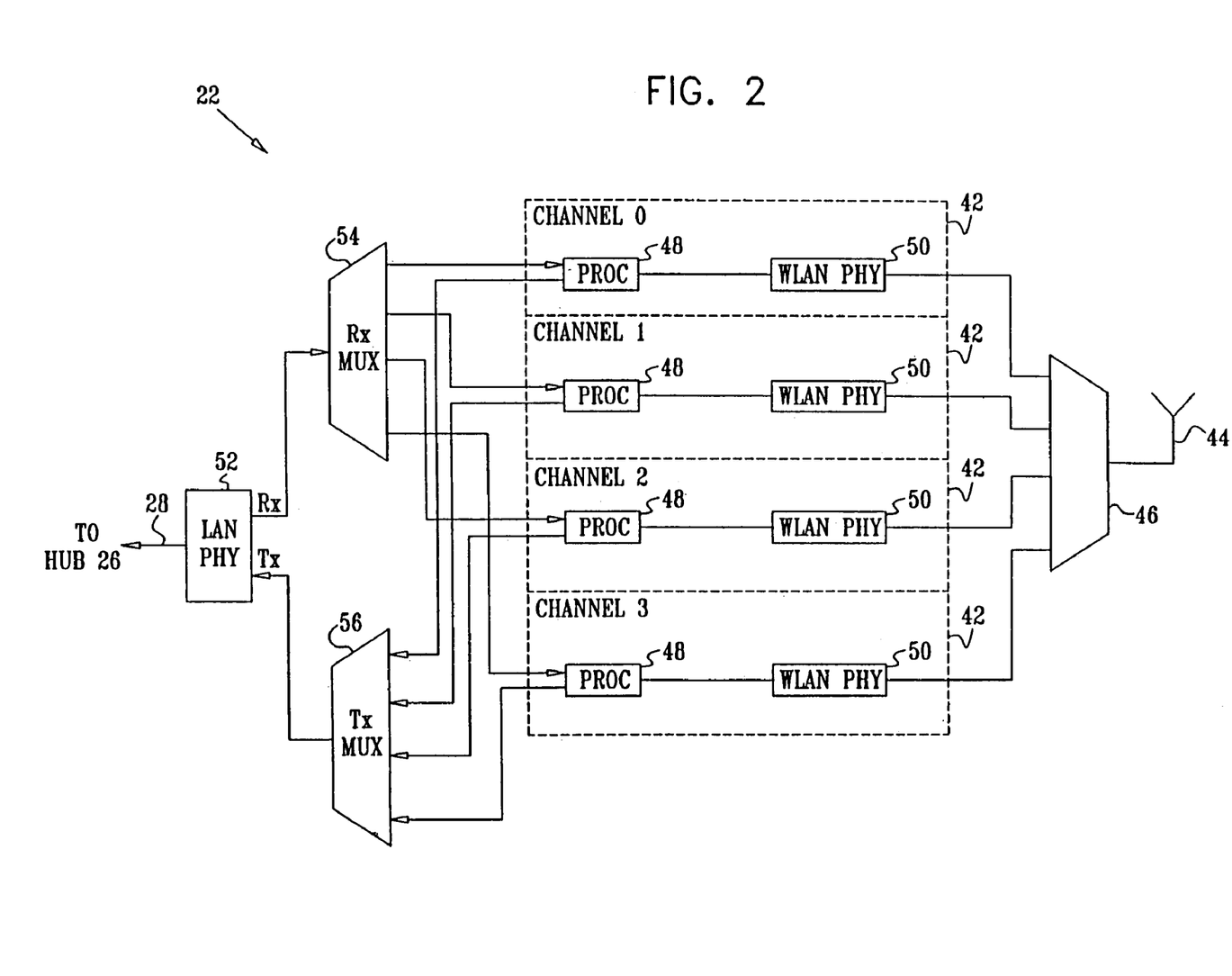
FIG. 2 is a block diagram that schematically shows details of a multi-channel WLAN access point, in accordance with an embodiment of the present invention.

FIG. 2 is a block diagram that schematically shows details of access points 22, in accordance with an embodiment of the present invention. Each access point comprises multiple wireless communication units 42, each of which is configured to transmit and receive signals via an antenna 44 on a respective frequency channel of the WLAN. Accordingly, units 42 are labeled by channel: "channel 0," "channel 1," etc. Although access point 22 is shown in this figure as comprising four such wireless communication units, the access point may alternatively be configured to comprise a larger or smaller number of units, and thus may accommodate a larger or smaller number of frequency channels.

Each wireless communication unit 42 comprises a WLAN physical layer interface (WLAN PHY) 50, comprising a radio transceiver that is tuned to the respective frequency channel of the transceiver. WLAN PHY 50 may comprise a standard, off-shelf device, such as the RD0314 board, made by RF Micro Devices (Greensboro, N.C.). The WLAN PHY devices are connected to antenna 44 (or to a pair of antennas—not shown—for diversity purposes) via an antenna multiplexing circuit 46. In an exemplary embodiment, circuit 46 is constructed as described in the above-mentioned U.S. patent application Ser. No. 10/370,211.

A medium access control (MAC) processor 48 in each channel performs higher-level message processing functions. Processor 48 performs MAC-level processing of the uplink packets received by PHY 50 from mobile stations 24, and generates downlink packets for transmission by PHY 50, in accordance with the 802.11 standard (or any other applicable WLAN standard). In addition, processor 48 may be responsible for messaging over LAN 28, as described above, to determine which of access points 22 is to serve each mobile station 24. Typically, processor 48 comprises a programmable microprocessor or logic device, such as a field-programmable gate array (FPGA), which is configured to communicate with WLAN PHY 50 and with LAN 28 (via a suitable LAN PHY, as described below), and is programmed to carry out the functions described herein.

MAC processors 48 in units 42 are linked to LAN 28 by a single LAN physical layer interface (LAN PHY) 52, typically an Ethernet PHY device, such as the KS8721B Physical Layer Transceiver, made by Micrel-Kendin (Sunnyvale, Calif.). Each data frame transmitted from hub 26 over LAN 28 may contain chunks of data belonging to multiple channels, i.e., data that are destined for different units 42 in a given access point 22. An exemplary format of these data frames is shown below in FIG. 3. A receive demultiplexer 54 parses each of these frames so as to distribute the data chunks they contain to processors 48 in the appropriate units 42. Similarly, data chunks generated by processors 48 for transmission over LAN 28 to hub 26 are multiplexed into data frames of this sort by a transmit multiplexer 56. Hub 26 performs comparable multiplexing and demultiplexing functions for each access point, as described below with reference to FIG. 4.

The functional blocks of access point 22 shown in FIG. 2 are chosen for conceptual clarity, and do not necessarily represent the physical components that might actually be used to implement the design shown here. The functional blocks shown in the figure may be combined into one or more custom integrated circuit components, or they may alternatively be broken into a larger number of custom or off-shelf components. Logical and control elements of access point 22 may comprise either hard-wired or programmable components, with appropriate software, as will be apparent to those skilled in the art.

Figure 3:
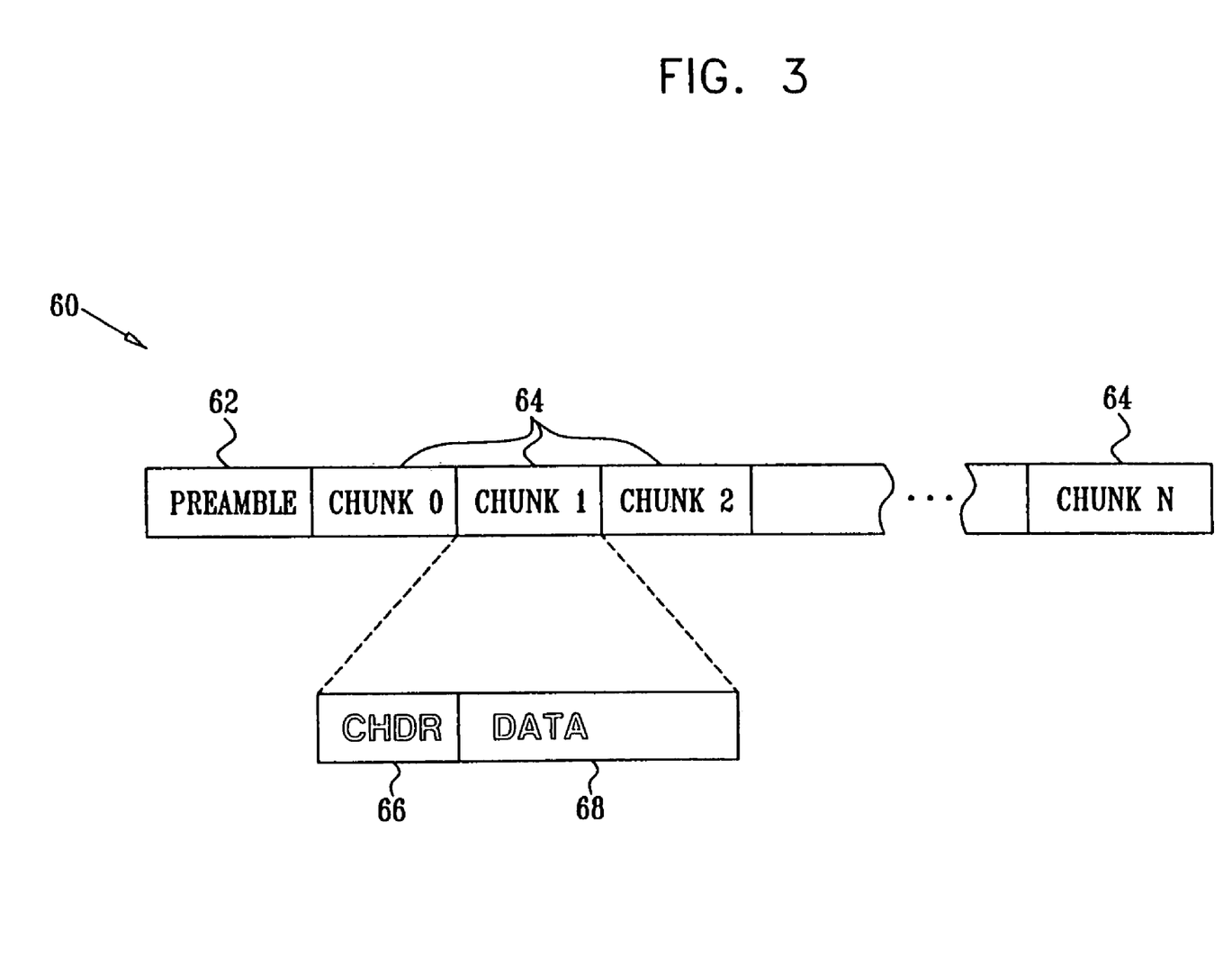
FIG. 3 is a block diagram that schematically illustrates a multiplexed data frame, in accordance with an embodiment of the present invention.

FIG. 3 is a block diagram that schematically illustrates a multiplex data frame 60, which is transmitted over LAN 28, in accordance with an embodiment of the present invention. Frames of this sort are assembled by transmit multiplexer 56 for transmission over LAN 28 to hub 26, and are also received from the hub and disassembled by receive demultiplexer 54. Frame 60 comprises a preamble 62, followed by a sequence of data chunks 64 of fixed size. The preamble typically comprises a predefined bit sequence marking the beginning of the frame, for the purpose of synchronization of LAN PHY 52. For example, assuming LAN 28 to operate in accordance with the Ethernet 100BASE-T specification, preamble 62 is 01010101. Frame 60 typically contains a fixed number of chunks 64, which may be any number up to a maximum that is determined by the maximum permitted frame size on LAN 28. Alternatively, the sizes of frames 60 may be variable, up to the permitted maximum.

Note that frame 60 typically does not include a conventional MAC header. Since hub 26 is connected to each access point 22 by a dedicated, point-to-point link, all frames transmitted over the link are received by the appropriate receive demultiplexer. There is thus no need for a MAC header to identify the source and destination addresses of frame 60 and other frame parameters. Alternatively, a MAC header may be added to frame 60 if desired, with appropriate changes to the access points and hub in order to handle the header.

Each chunk 64 comprises a chunk header (CHDR) 66 and a chunk payload 68. The header comprises a code indicating the channel to which the chunk belongs and, optionally, additional control information. Table I below provides an exemplary specification of a four-bit chunk header, for use in embodiments in which access points 22 serve up to four channels. Payload 68 typically comprise a short data segment, for example, forty bits of data, provided by or directed to processor 48 for the channel in question. The data segment may comprise either a part of a data packet conveyed via access point 22 between mobile station 24 and hub 26, or a control message exchanged between the access point and the hub. The control messages are used for system management functions, such as determining which access point is to serve a given mobile station, as described above.

TABLE I

CHUNK HEADER DEFINITION

| Header | Meaning |
| --- | --- |
| 1100 | Void chunk, no data to transmit |
| cc11 | First normal-priority chunk for channel "cc" |
| cc01 | Non-first normal-priority chunk for channel "cc" |
| cc10 | High-priority chunk for channel "cc" |

High-priority chunks may optionally be used to carry special, short control messages that must be transmitted with low latency. Normal-priority chunks are used for data packets and for low-priority control messages. Alternatively, all chunks may have the same priority (in which case header cc10 is not used for this purpose).

When processor 48 on any channel has data—either a data packet or a control message—to send to hub 26, it signals multiplexer 56, typically by raising a "chunk_ready" flag. (Separate flags may be provided for normal and high-priority messages.) The flag remains raised as long as the processor has more data to send. Multiplexer 56 reads a fixed length of data (forty bits in the present example) in turn from each processor that has raised its chunk_ready flag, while skipping over channels that have no data. Any suitable multiplexing algorithm may be used for this purpose. For example, a round robin algorithm may be used to serve all channels with equal priority. Alternatively, if one of the WLAN channels has greater capacity or higher priority than others, a weighted queuing algorithm may be used in order to increase the share of the bandwidth on LAN 28 that is allocated to that channel at the expense of the others. When no channel has data to send, multiplexer 56 sends a chunk of void data, which is ignored by hub 26.

Multiplexer 56 adds the appropriate chunk header 66 to each chunk, depending on the originating channel and the priority of the chunk payload. Each data packet sent by processor 48 is typically fragmented among multiple chunks 64. Multiplexer 56 typically marks the first chunk of a given data packet with a special first chunk header, as shown in Table I, to indicate to the receiving side that a new packet is starting. The first few chunks of any given packet contain the packet header, followed by the packet payroll in subsequent chunks, and ending generally with an error detection code, such as a CRC, in the final chunk or chunks.

Since the packet length is generally not an integer multiple of the chunk payroll size, processor 48 or multiplexer 56 may pad the last chunk in the packet with dummy bits. As the packet header generally contains a field that indicates the packet length, there is no need to mark the last chunk. Rather, the receiving processor identifies the last chunk based on the known packet length and thus discards any padding bits that have been added. Alternatively, the packets (or at least certain, predefined types of packets) may be of fixed size, in which case the receiving processor determines the packet length based on the packet type. Further alternatively, the last chunk in each packet may be marked with a special chunk header, instead of or in addition to marking the first chunk.

After sending the last chunk 64 in a given frame 60, multiplexer 56 waits for a predefined interval, typically the Inter-Packet Gap (IPG) interval provided by the physical layer specification of LAN 28. The multiplexer then starts transmitting the next frame, beginning with preamble 62.

Upon receiving frame 60 from hub 26, receive demultiplexer 54 detects and removes preamble 62, and then reads chunk header 66 of the first chunk 64 in the frame to determine the channel for which the chunk is destined. The demultiplexer signals processor 48 of the appropriate channel, typically by raising a write enable flag, and then passes payload 68 of the chunk to the processor after stripping header 66. Based on the chunk header, the demultiplexer may also signal the processor, as appropriate, to indicate that the current chunk is the first chunk in a packet or that the current chunk contains a control message. Processor 48 reassembles data packets from the chunk fragments that it receives and transmits the data packets to the appropriate mobile station 24.

Although the generation and demultiplexing of frames 60 is described hereinabove with reference to access points 22, hub 26 also performs frame generation and demultiplexing functions in a substantially identical manner.

Figure 4:
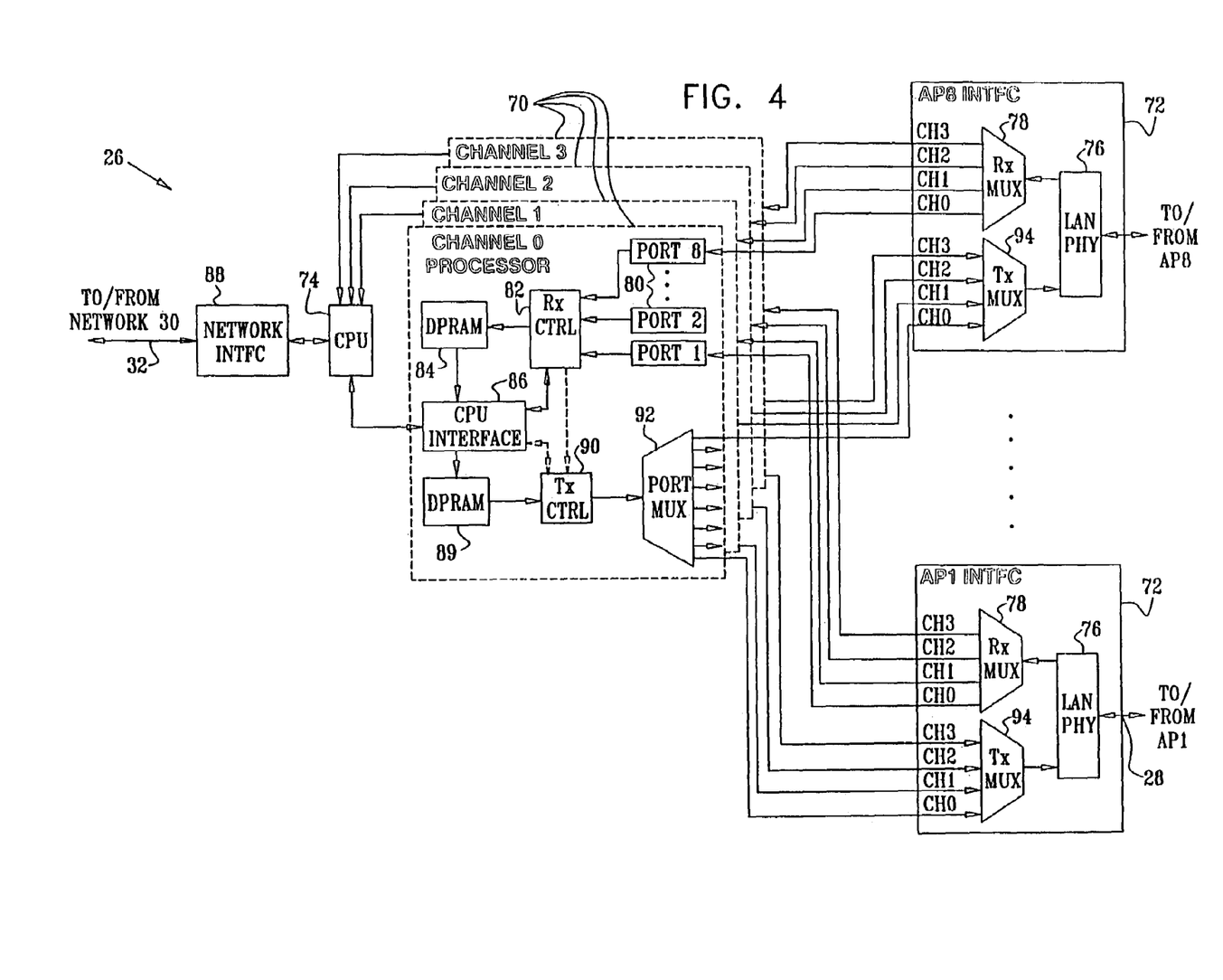
FIG. 4 is a block diagram that schematically shows details of a hub in a WLAN system, in accordance with an embodiment of the present invention.

FIG. 4 is a block diagram that schematically shows details of hub 26, in accordance with an embodiment of the present invention. Hub 26 comprises multiple access point (AP) interface units 72, each of which is connected via a link of LAN 28 to a respective access point 22. In the present example, the hub comprises eight such interfaces (for access points AP1 through AP8), but the hub may alternatively serve a larger or smaller number of access points.

AP interface units 72 are connected via multiplexing circuits, as described hereinbelow, to channel processors 70. Each channel processor 70 is assigned to process data and control messages for a respective frequency channel of the access points. In other words, the "channel 0 processor" shown in FIG. 4 processes downlink and uplink messages to and from mobile stations that are transmitted and received by the "channel 0" units 42 in all of access points 22, as well as sending and receiving control messages to and from these units. Thus, four channel processors 70 are shown in FIG. 4, corresponding to the four channels served by the respective wireless communication unit in each access point. The functions of the channel processors (and possibly some of the functions of AP interface units 72) may be performed by suitably-programmed logic devices, such as the Cyclone™ EP1C20 FPGA chip, produced by Altera Corp. (San Jose, Calif.).

A central processing unit (CPU) 74 controls the operation of channel processors 70, as well as performing high-level message processing functions. Although a single CPU is shown in FIG. 4 as controlling all the channel processors, in an alternative embodiment each channel may have its own CPU, with connections between the channel CPUs for inter-channel signals. CPU 74 may comprise one or more Intel XScaler™ processors, with an Ethernet reduced medium independent interface (RMII) for communicating with the channel processors.

Frames transmitted over LAN 28 by each access point 22 are received by a LAN physical layer interface (LAN PHY) 76 in the respective AP interface unit 72. These frames have the form of frame 60, as shown in FIG. 3. Chunks 64 in these frames are demultiplexed to channel processors 70 by a receive demultiplexer 78, in the manner described above. Each channel processor comprises multiple port decoders 80, each assigned to receive the chunk data from the receive demultiplexer of the respective AP interface unit 72. The port decoders reassemble the uplink data packets from the fragments contained in chunks 64, and pass the packets to a receive controller 82. The receive controller performs basic MAC level packet processing functions, and then places the packets in a dual-port RAM (DPRAM) 84. Although for conceptual clarity, decoders 80 and controller 82 are shown as separate units, the functions of these units may be integrated in a single processing stage, and the controller may thus be aware of the operation of demultiplexer 78.

A CPU interface controller 86 passes the packets from DPRAM 84 in each of channel processors 70 to CPU 74. Depending on the destination address of each uplink packet; the CPU may either route the packet downlink via the appropriate channel and access point 22 to another mobile station 24, or may route the packet via a network interface 88 to external network 30.

CPU 74 passes downlink packets (whether received from network 30 via interface 88 or from mobile stations 24) via interface controller 86 to another DPRAM 89. A transmit controller 90 reads the packets from DPRAM 89, performs basic MAC level processing functions, and passes the packets to a port multiplexer 92, which distributes the packets to the appropriate AP interface units 72. Multiplexer 92 sends each packet to the AP interface unit that is associated with the access point that is assigned to serve the mobile station to which the packet is destined. Broadcast messages are distributed to all AP interfaces. In this manner, each AP interface unit 72 may receive inputs from all of channel processors 70. A transmit multiplexer 94 in the interface unit multiplexes the downlink packets and control messages via LAN PHY 76 onto LAN 28 in the manner described above.

In distinction to its treatment of uplink data packets, receive controller 82 passes control messages from access points 22 directly to CPU interface 86. Similarly, the CPU interface passes control messages for the access points directly to transmit controller 90. For certain types of signaling, receive controller 82 may also communicate directly with transmit controller 90. For example, when an uplink message from one of mobile stations 24 requires that the receiving access point return an acknowledgment to the mobile station (as required by the 802.11 specification), the receive controller may directly instruct the transmit controller to signal the proper access point to issue the acknowledgment. In this manner, the latency of the acknowledgment is substantially reduced.

As noted earlier, although the embodiments described above relate to certain specific communication protocols and hardware configurations conforming with these protocols, the principles of the present invention may be applied to WLAN systems, access points and hubs of other types, operating in accordance with other protocols that are or may become known in the art. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An access point for use in a wireless local area network (WLAN), the access point comprising:
   one or more wireless communication units, which are adapted to exchange data with mobile stations by transmitting and receiving signals over the air on respective frequency channels of the WLAN;
   a physical layer interface, which is adapted to be coupled to a communication medium, so as to connect the one or more wireless communication units to communicate with a hub over a single physical link of the communication medium; and
   a multiplexer, coupled between the one or more wireless communication units and the physical layer interface so as to convey the data from the one or more wireless communication units to the physical layer interface for transmission over the single physical link with a first priority, while conveying control messages via the physical layer interface for transmission over the single physical link between the access point and the hub with a second priority, higher than the first priority.

2. The access point according to claim 1, wherein the multiplexer is adapted to generate frames of the data for transmission over the physical link, and to combine chunks of the data from the one or more wireless communication units with at least one of the control messages in each of at least some of the frames.

3. The access point according to claim 2, wherein each of the frames comprises a plurality of slots, and wherein the multiplexer is adapted to insert the chunks and the control messages into respective slots together with respective slot headers containing a priority indication.

4. The access point according to claim 2, wherein the data conveyed from the one or more wireless communication units comprises data packets, and wherein the multiplexer is adapted to fragment the packets among the chunks.

5. The access point according to claim 1, wherein the one or more wireless communication units are adapted to communicate with the mobile stations in accordance with an IEEE 802.11 specification, which defines the frequency channels.

6. The access point according to claim 1, wherein the communication medium comprises a wired local area network (LAN).

7. The access point according to claim 6, wherein the physical layer interface is adapted to transmit and receive data frames over the communication medium in accordance with an Ethernet physical layer specification.

8. The access point according to claim 1, wherein the communication medium is a distribution system medium of the WLAN.

9. The access point according to claim 1, and comprising a demultiplexer, coupled between the one or more wireless communication units and the physical layer interface so as to separate downlink data from downstream control messages received over the single physical link from the hub.

10. A system for mobile communication, comprising:
a hub;
a communication medium, coupled to the hub; and
a plurality of access points, each of which comprises:
   one or more wireless communication units, which are adapted to exchange data with mobile stations by transmitting and receiving signals over the air on respective frequency channels of a wireless local area network (WLAN); and
   a physical layer interface, coupled to the communication medium, so as to connect the one or more wireless communication units to communicate with the hub over the communication medium; and
   a multiplexer, coupled between the one or more wireless communication units and the physical layer interface so as to convey the data from the one or more wireless communication units to the physical layer interface for transmission over the communication medium with a first priority, while conveying control messages via the physical layer interface for transmission over the communication medium between the access point and the hub with a second priority, higher than the first priority.

11. The system according to claim 10, wherein the communication medium comprises a plurality of links, which are coupled to the hub, and wherein the physical layer interface is coupled to a single, respective link among the plurality of the links of the communication medium.

12. The system according to claim 10, wherein the access points have respective service areas and are arranged so that at least some of the service areas overlap.

13. The system according to claim 12, wherein the hub and the wireless communication units are arranged to exchange the control messages so as to determine which of the access points is to serve each of the mobile stations.

14. The system according to claim 10, wherein each of the access points comprises a demultiplexer, coupled between the one or more wireless communication units and the physical layer interface so as to separate downlink data from downstream control messages received over the communication medium from the hub.

15. The system according to claim 10, wherein the multiplexer is adapted to generate frames of the data for transmission over the communication medium, and to combine chunks of the data from the one or more wireless communication units with at least one of the control messages in each of at least some of the frames.

16. The system according to claim 15, wherein each of the frames comprises a plurality of slots of fixed length, and wherein the multiplexer is adapted to insert the chunks and the control messages into respective slots together with respective slot headers containing a priority indication.

17. The system according to claim 15, wherein the data conveyed from the one or more wireless communication units comprises data packets, and wherein the multiplexer is adapted to fragment the packets among the chunks.

18. A method for mobile communication, comprising:
arranging an access point in a wireless local area network (WLAN), the access point comprising one or more wireless communication units, which are adapted to exchange data with mobile stations by transmitting and receiving signals over the air on respective frequency channels of the WLAN;
coupling the access point to a hub over a single physical communication link; and
multiplexing the data together with control messages for transmission between the access point and the hub over the single physical communication link so as to convey the data with a first priority while conveying the control messages with a second priority, higher than the first priority.

19. The method according to claim 18, wherein arranging the access point comprises arranging multiple access points, having respective service areas, in the WLAN so that at least some of the service areas overlap, and comprising determining which of the wireless communication units is to serve each of the mobile stations responsively to the control messages.

20. The method according to claim 18, wherein conveying the data further comprises demultiplexing the data from the control messages received at the access point over the single physical link from the hub.

21. The method according to claim 18, wherein multiplexing the data together with the control messages comprises generating frames of the data for transmission over the communication medium, while combining chunks of the data from the one or more wireless communication units with at least one of the control messages in each of at least some of the frames.

22. The method according to claim 21, wherein each of the frames comprises a plurality of slots of fixed length, and wherein combining the chunks comprises inserting the chunks and the control messages into respective slots together with respective slot headers containing a priority indication.

23. The method according to claim 21, wherein conveying the data comprises conveying data packets, and wherein multiplexing the data comprises fragmenting the packets among the chunks.

* * * * *

UNITED STATES PATENT AND TRADEMARK OFFICE
CERTIFICATE OF CORRECTION

| | | |
|---|---|---|
| PATENT NO. | : 7,164,674 B2 | Page 1 of 1 |
| APPLICATION NO. | : 11/364464 | |
| DATED | : January 16, 2007 | |
| INVENTOR(S) | : Shpak | |

It is certified that error appears in the above-identified patent and that said Letters Patent is hereby corrected as shown below:

On the title page item (56) line 1,
In Other Publications insert -- Published U.S. Application No.: 2002/0061024 --.

In Other Publications insert -- Published U.S. Application No.: 2002/0009982 --.

In Other Publications insert -- U.S. Patent Application No.: 10/214,271, entitled: "Collaboration between wireless lan access points", filed August 7, 2002 --.

In Other Publications insert -- U.S. Patent Application No.: 10/272,686, entitled: "Collaboration between wireless lan access points using wired lan infrastructure", filed October 17, 2002 --.

In Other Publications insert -- U.S. Patent Application No.: 10/343,863, entitled: "Lan with message interleaving", filed January 22, 2003 --.

Signed and Sealed this

Third Day of July, 2007

JON W. DUDAS
*Director of the United States Patent and Trademark Office*